United States Patent [19]

Jones

[11] Patent Number: 5,757,642

[45] Date of Patent: May 26, 1998

[54] MULTI-FUNCTION SERVER INPUT/OUTPUT SUBSYSTEM AND METHOD

[75] Inventor: Craig Steven Jones, Lago Vista, Tex.

[73] Assignee: Dell USA L.P., Round Rock, Tex.

[21] Appl. No.: 883,907

[22] Filed: Jun. 27, 1997

Related U.S. Application Data

[63] Continuation of Ser. No. 376,314, Jan. 20, 1995, abandoned.

[51] Int. Cl.$^6$ .............................. G05B 15/00; G06F 11/00
[52] U.S. Cl. ........................... 364/134; 364/187; 371/9.1
[58] Field of Search .................................. 364/131, 133, 364/134, 176, 187; 371/8.1, 9.1; 395/200.33, 200.43; 340/825.15, 825.16

[56] References Cited

U.S. PATENT DOCUMENTS

| | | | |
|---|---|---|---|
| 4,597,077 | 6/1986 | Nelson et al. | 370/88 |
| 4,679,191 | 7/1987 | Nelson et al. | 370/84 |
| 4,819,159 | 4/1989 | Shipley et al. | 371/9.1 |
| 5,086,429 | 2/1992 | Gray et al. | 371/9.1 |
| 5,163,131 | 11/1992 | Row et al. | 395/200 |
| 5,355,453 | 10/1994 | Row et al. | 395/200 |
| 5,408,649 | 4/1995 | Beshears et al. | 395/575 |
| 5,455,932 | 10/1995 | Major et al. | 395/489 |

*Primary Examiner*—Paul P. Gordon
*Attorney, Agent, or Firm*—Skjerven, Morrill, MacPherson, Franklin & Friel, L.L.P.; Stephen A. Terrile

[57] ABSTRACT

A method and system for providing fault tolerance in a networked client/server computing environment by introducing a server computer comprised of a first computer with a first secondary storage controller and a first communications controller and a second computer with a second secondary storage controller and a secondary communications controller. The invention introduces a high speed communications channel that runs between secondary storage controllers and communications controllers in each of the computers, thereby allowing data flow between the communications controllers and enabling the first and second computers to mirror each other or cooperate to form a cluster server. In addition, the communications channel serves as a pathway for secondary storage I/O dataflow, thereby enabling the first and second computers to share secondary storage resources.

34 Claims, 5 Drawing Sheets

MULTI-FUNCTION SERVER INPUT/OUTPUT SUBSYSTEM AND METHOD

This application is a continuation of application Ser. No. 08/376,314, filed Jan. 20, 1995, now abandoned.

TECHNICAL FIELD OF THE INVENTION

The present invention is directed, in general, to computer systems and more specifically to an input/output ("I/O") subsystem for a network server computer that allows for sharing of secondary resources between mirrored or clustered servers and provides, in a preferred embodiment, redundant communications channels between the servers.

BACKGROUND OF THE INVENTION

Immeasurable gains in technology offered in personal computers ("PCs") have allowed PCs to assume roles performed only by mainframe or minicomputers in the past. Many companies and individual users rely solely on commercially-available PCs to meet their information processing needs. Thus, it is vital that their PCs perform reliably. The fault tolerance of a given computer system is a sensitive issue with companies and individual users given the level of reliance they place on their computer systems.

Initially PCs were stand-alone devices, each containing separate hardware, operating system, application software and user data. However, as use of PCs spread within business organizations, the need for shared data and hardware resources grew, and local area network ("LANs") came into being. A LAN (or its more-geographically-dispersed counterpart, the wide area network ("WAN")) comprises a number of PCs ("clients") linked to one another (typically by a high speed serial communications link) and centers around a relatively high performance PC (a "server") that delivers application programs and data to the clients and manages system-wide resources, such as secondary storage units and printers.

The LAN concept has proven useful but suffers from a few disadvantages. First, since management of the LAN is focused in the server, the overall performance of the LAN is compromised when the server becomes a processing bottleneck. Second, and also due to the fact that the server is the focus of the LAN, if the server fails, the LAN also fails. Failure of the LAN may result in data loss and almost certainly results in valuable time being lost.

The prior art has attempted to address the first of the above-noted disadvantages by introducing the concept of "clustering," wherein management of the LAN is divided among two or more relatively high-performance PCs cooperating to split the processing workload. The clustered server PCs communicate by a high speed communications channel that is separate from the LAN communications link, allowing the server PCs to share information at a higher rate and without compromising the bandwidth available on the LAN communications link. Unfortunately, should the high speed communications channel between the two or more server PCs fail, the cluster and the LAN fail.

The prior art attempted to address the second of the above-noted disadvantages by introducing the concept of "mirroring" or "shadowing," wherein a single server PC (a "master") manages the LAN, but a second, similar server PC (a "slave") operates in parallel to the master, duplicating the actions of the master in every detail. Mirroring is also implemented via operating system software, such as Netware® 3.12 SFT-III.

As in clustering, a high speed communications channel separate from the LAN communications link couples the master and the slave, ensuring sufficient bandwidth for data travelling therebetween. Should the master fail the slave is maintained in a condition to operate as the LAN server in a seamless fashion. Unfortunately, as above, should the high speed communications channel between the two or more server PCs fail the mirror functions fails and the LAN server (the master) loses its fault tolerance.

In the clustering and mirroring concepts above, each of the server PCs could function as a stand-alone PC. More specifically, each server PC has a secondary storage or disk subsystem conventionally comprising one or more hard disk drives providing nonvolatile storage for the server PC.

Secondary storage subsystems are relatively expensive. Furthermore, the prior art has provided secondary storage subsystems that are fault-tolerant in themselves so that the secondary storage subsystem can recover from failure of a disk drive. Such secondary storage subsystem may be configured as a redundant array of inexpensive disks ("RAID"). A RAID is an array of disks organized so that they appear to the operating system as a single logical disk drive. RAID allows inexpensive disks to cooperate to form a fault tolerant mass storage system. Thus, as a single RAID can be adapted to address the secondary storage needs of both server PCs, it is needlessly redundant to require a separate secondary storage subsystem for each of the server PCs.

Accordingly, what is needed in the art is a server computer system that (1) eliminates the redundancy of multiple secondary storage subsystems to improve the cost effectiveness of the server computer system and (2) provides needed redundancy in the high speed communications channel coupling the server PCs to improve fault tolerance without significantly increasing cost. Preferably, the server computer system should take advantage of recent advances in high speed serial communications technology.

SUMMARY OF THE INVENTION

To address the above-discussed deficiencies of the prior art, it is a primary object of the present invention to provide a server computer system that allows sharing of a secondary storage subsystem between at least two computers to reduce the cost associated with prior art mirroring or clustering server computer systems.

In the attainment of the above primary object, the present invention provides a server computer system and a method of operation thereof. The server computer comprises: (1) a first computer having a first processor coupled to a first secondary storage controller and a first communications controller, (2) a second computer having a second processor coupled to a second secondary storage controller and a second communications controller, a communications channel coupling the first and second secondary storage controllers and the first and second communications controllers and providing a channel for communication of data between the first and second processors to thereby allow an operation of the second computer to mirror an operation of the first computer and (3) a secondary storage unit coupled to the communications channel and accessible by a selected one of the first and second processors, the communications channel further providing a channel for communication of data between the first and second computers and the secondary storage unit, the secondary storage unit thereby being available to the second computer upon occurrence of a failure in the first computer.

Thus, the present invention introduces a relatively high speed communications channel that runs between secondary storage controllers and communications controllers in each of the computers. This architecture allows the communications channel to perform a dual purpose. First, the communications channel functions to allow data to flow between the communications controllers, thereby enabling the first and second computers to mirror one another or to cooperate to form a cluster server. Second, the communications channel serves as a pathway for secondary storage I/O dataflow, thereby enabling the first and second computers to share secondary storage resources.

In a preferred embodiment of the present invention, the first secondary storage controller and the first communications controller are embodied as a single, integrated controller. This obviates redundant hardware in the controllers were they to be implemented separately.

In a preferred embodiment of the present invention, the server computer system further comprises a second communications channel coupling the first and second secondary storage controllers. This second channel provides a redundant pathway for secondary storage I/O dataflow between the first and second computers, thereby increasing the overall reliability and fault tolerance of the server computer system. In a more preferred embodiment, the server computer system further comprises a second communications channel coupled to the first and second secondary storage controllers and the first and second communications controllers to thereby provide a redundant channel for communication of data therebetween. In the more preferred embodiment, the second channel further provides a redundant pathway for communication of data via the first and second communications controllers of the first and second computers, thereby further increasing the overall reliability and fault tolerance of the server computer system without significantly increasing the cost of the server computer system.

In a preferred embodiment of the present invention, the secondary storage unit is dual-ported. In this embodiment, the first channel couples a first port on the secondary storage unit to the first and second secondary storage controllers. A second communications channel couples a second port on the secondary storage unit to the first and second secondary storage controllers to provide redundancy and to increase the rate of dataflow between the first and second computers and the secondary storage unit.

In a preferred embodiment of the present invention, the server computer system further comprises a plurality of secondary storage units coupled to the communications channel. Thus, the present invention is preferably adapted to operate with a group of secondary storage units to increase the overall storage capacity of the server computer system. In this embodiment, the secondary storage units are hard disk drives. The terms "disk," "disk drive" and "secondary storage unit" are used herein almost interchangeably to refer to a conventional nonvolatile mass storage device. However, those skilled in the art will understand that non-disk and volatile secondary storage devices fall within the scope of the present invention.

In a preferred embodiment of the present invention, the first and second processors control the first and second secondary storage controllers via first and second secondary storage driver routines and first and second communications driver routines executed in the first and second processors, respectively. A primary advantage of this preferred embodiment is that the server computer system hardware does not appear to differ from prior art mirrored or clustered computers to the operating system. Therefore, with reference to the exemplary prior art server system described previously, the Netware( operating system does not need to be modified to execute in and control the server computer system of the present invention. Therefore, first and second operating systems executing in the first and second processors, respectively, control the first and second secondary storage controllers in a transparent manner.

In one embodiment of the present invention, the communications channel is a loop channel passing through the secondary storage unit. As will be described in more detail, some high speed serial communications channel architectures are preferably configured as loops. Other architectures are designed specifically to be used as loops. The present invention is adapted to either loop or non-loop architectures.

In a preferred embodiment of the present invention, the first and second communications channels have a data rate of at least 10 megabytes per second. In a more preferred embodiment, the data rate is at least 100 megabytes per second. This high data rate affords a sufficient bandwidth for communication of data between the first and second computers to allow one computer to mirror the other or to allow the two to act in concert as a cluster. This high rate further allows for sufficient dataflow between the first and second computers and the secondary storage unit.

In one embodiment of the present invention, a first operating system executing in the first processor designates the first computer as a master computer and a second operating system executing in the second processor designates the second computer as a slave computer. In this embodiment, the second computer mirrors an operation of the first computer. If the first computer ceases to operate normally, the second computer takes it place and continues to have access to the secondary storage unit.

In an alternative embodiment of the present invention, operating systems executing in the first and second processors cooperate to divide processing tasks between the first and second computers. In this embodiment, the first and second computers cooperate to function as a cluster. The shared secondary storage unit allows for more efficient and rapid sharing of data between the first and second computers.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
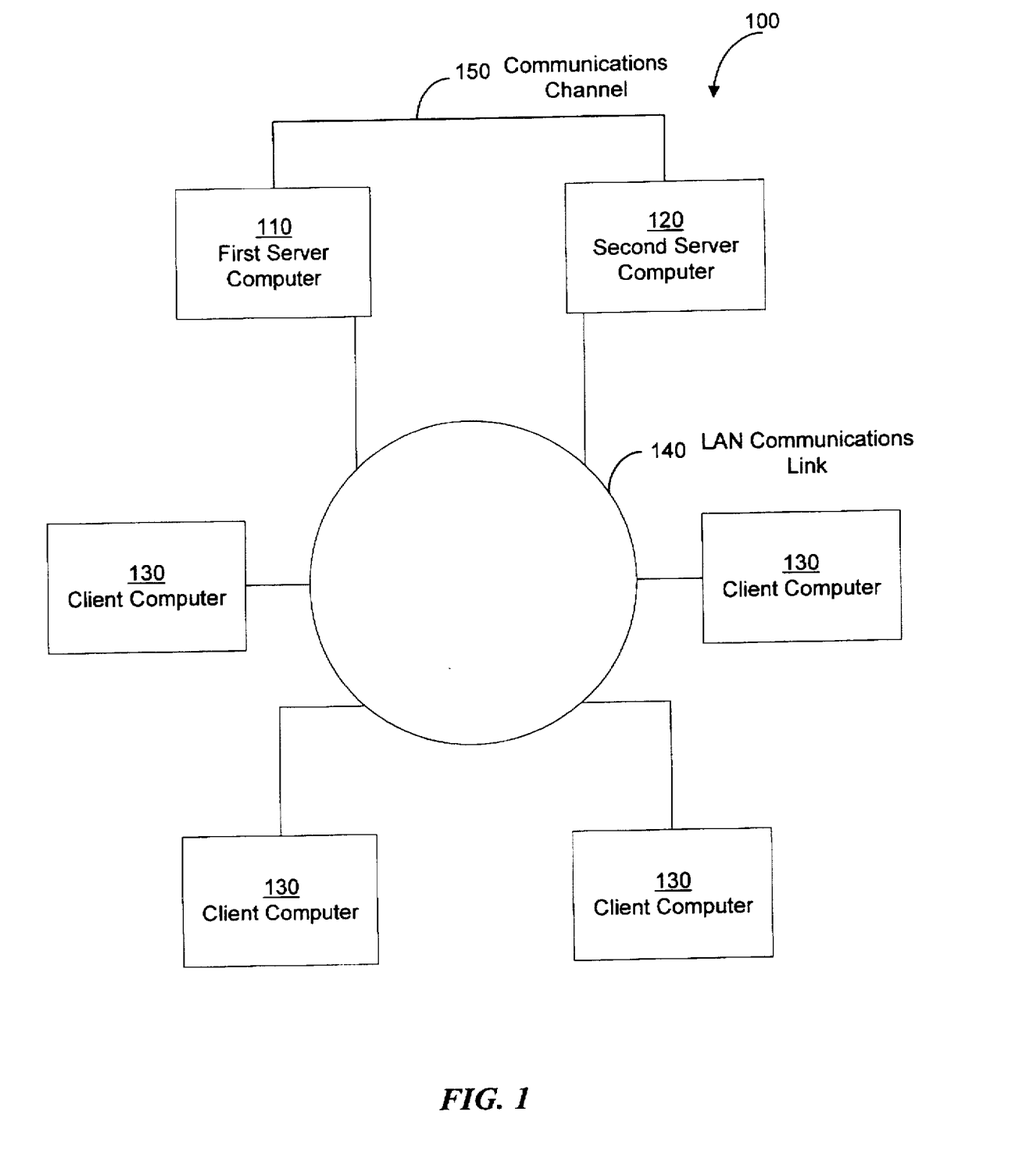
FIG. 1 illustrates a block diagram of first and second server computers functioning as a mirrored or clustered network server in a LAN.

Referring initially to FIG. 1, illustrated is a block diagram of first and second server computers 110, 120 functioning as a mirrored or clustered network server in a LAN 100. The LAN 100 is shown as being in the form of a ring, although the present invention is equally applicable in the environment of bus LANs. Preferably, the first and second server computers 110, 120 are PCs, although such is not necessary to fall within the scope of the present invention.

Also shown are a plurality of client computers 130 coupled to a LAN communications link 140. The link 140 allows transmission of data, typically in packet form, among all the computers, and particularly between the server (comprising the first and second server computers 110, 120) and the client computers 130 to allow the server (again, the first and second server computers 110, 120) to deliver centralized applications programs and data to the client computers 130 as needed.

The first and second server computers 110, 120, may cooperate in a selected one of several logical configurations, depending upon a desired degree of processing or storage speed or redundancy. Cooperation is achieved by means of a communications channel 150 bridging the first and second server computers 110, 120 and separate from the LAN communications link 140. The specific manner in which the communications channel 150 interconnects the first and second server computers 110, 120 will be explained in more detail in conjunction with FIGS. 2 through 5.

In one configuration, the second server computer 120 (acting as a slave), for instance, mirrors or shadows the first server computer 110 (acting as a master). In this mirror configuration, the first server computer actually acts as the LAN 100 server. Any operation undertaken in the first server computer 110 that affects its state is also performed in the second server computer 120 such that, at any given time, the second server computer 120 is in the same state as the first server computer 110. If the first server computer 110 ceases to operate normally (detectible by one of a number of conventional means), the second server computer 120 is poised to stand in place of the first server computer 110 in a relatively seamless fashion to preserve the integrity of the LAN 100.

In another configuration, the first and second server computers 110, 120 share the load, acting together as the LAN server. In this clustered configuration, the states of the first and second server computers differ from one another.

It is apparent that the mirrored or shadowed configuration is directed towards server reliability, as there is complete duplication of all processes undertaken by the computer actually acting as LAN 100 server. Because, in the example above, the second server computer 120 is relegated to duplicate the actions of the first server computer 110, the speed of the server is limited by the speed of the first server computer 110.

It is also apparent that the clustered configuration is directed towards server speed, since the first and second server computers 110, 120 share processing tasks. However, this speed is obtained at the expense of reliability, as the server fails if either the first server computer 110 or the second server computer 120 fails.

Figure 2:
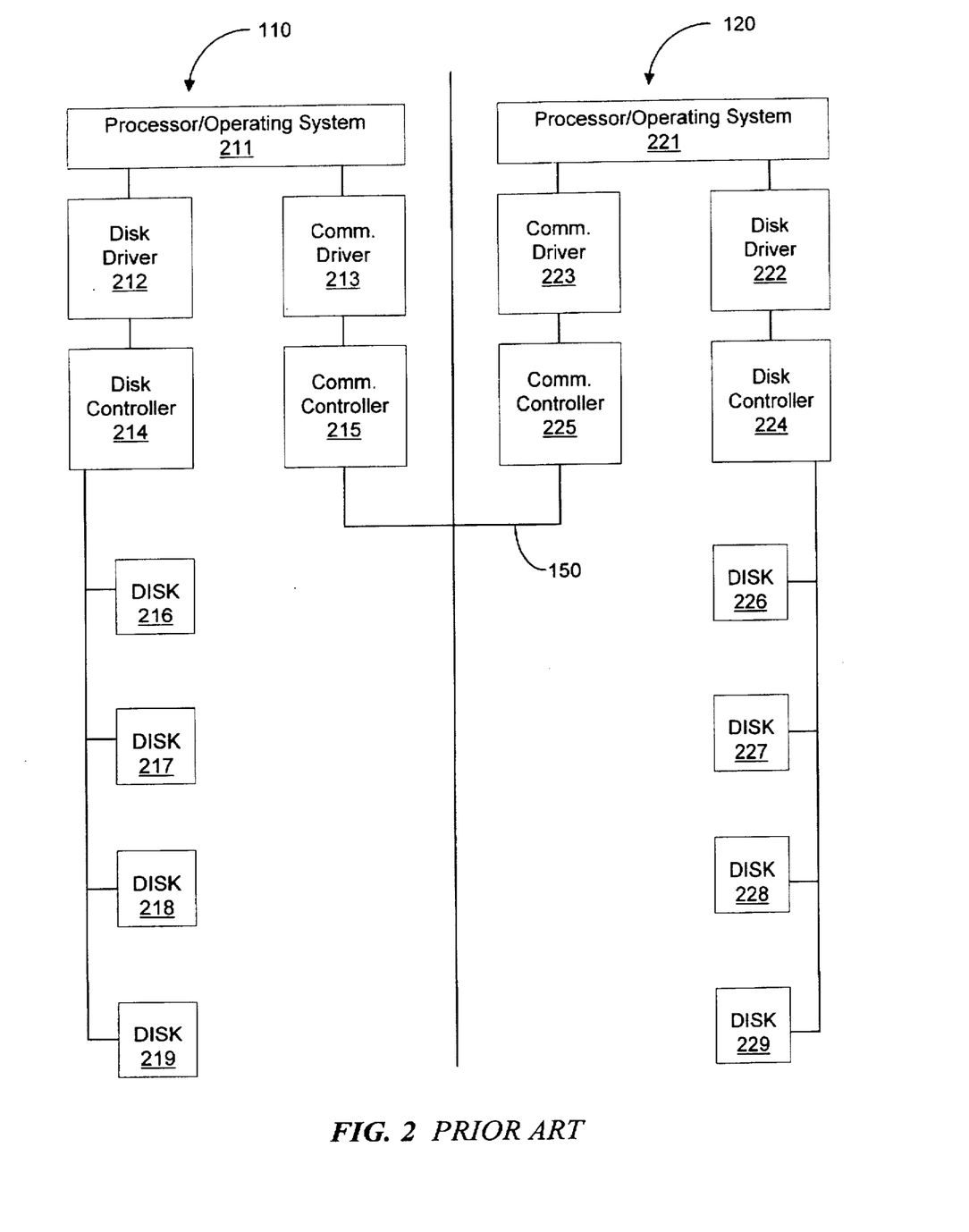
FIG. 2 illustrates a block diagram of a prior art mirrored or clustered network server computer system.

Turning now to FIG. 2, illustrated is a block diagram of a prior art mirrored or clustered network server computer system. The server computer system shown in FIG. 2 is a more detailed view of the first and second server computers 110, 120 of FIG. 1. The LAN communications link 140 of FIG. 1 is not shown for simplicity's sake.

The first computer 110 comprises a first processor adapted to execute a first operating system. The first processor/operating system are referenced jointly as 211. The first operating system controls the first server computer 110 and determines, in conjunction with a corresponding second operating system executing in the second server computer 120, whether the first and second server computers 110, 120 cooperate in a mirror or cluster configuration. Such operating system software is commercially available from the Novell Corporation and is currently designated as Netware® 3.12 SFF-III.

The first processor/operating system 211 is adapted to communicate data with one or more secondary storage units via a first disk (or secondary storage) driver 212, that is typically implemented as a series of software instructions. The first disk driver 212 controls a first disk (or secondary storage) controller 214 (typically implemented in hardware) that, in turn, controls one or more logical or physical secondary storage units (or disks) 216, 217, 218, 219. In this manner, the first processor/operating system 211 is able to store data to, and retrieve data from, the disks 216, 217, 218, 219.

The first processor/operating system 211 further communicates data to the communications channel 150 via a first communications driver 213 (typically implemented in software) and a first communications controller 215 (typically implemented in hardware). In this manner, the first processor/operating system 211 is able to transmit data to, or receive data from, the second server computer 120 to allow the first and second server computers 110, 120 to act in concert.

Likewise, the second server computer 120 comprises a second processor adapted to execute a second operating system. The second processor/operating system are referenced jointly as 221.

The second processor/operating system 221 is adapted to communicate data with one or more secondary storage units via a second disk (or secondary storage) driver 222. The second disk driver 222 controls a second disk (or secondary storage) controller 224 that, in turn, controls one or more logical or physical secondary storage units (or disks) 226, 227, 228, 229. In this manner, the second processor/operating system 221 is able to store data to, and retrieve data from, the disks 226, 227, 228, 229.

The second processor/operating system 221 further communicates data to the communications channel 150 via a second communications driver 223 and a second communications controller 225. In this manner, the second processor/operating system 221 is able to transmit data to, or receive data from, the second server computer 120 to allow the first and second server computers 110, 120 to act in concert.

As previously discussed, should the communications channel 150 between the first and second server computers 110, 120 fail the slave is no longer able to mirror the master, the mirror function fails and the master loses its fault tolerance. Further, as is apparent in FIG. 2, each of the first and second server computers 110, 120 can function as a stand-alone computer. Because secondary storage subsystems are relatively expensive and because the prior art has provided secondary storage subsystems that are fault-tolerant in themselves, it is needlessly redundant to require a separate secondary storage subsystem for each of the first and second server computers 110, 120. The present invention addresses both of these inadequacies.

Figure 3:
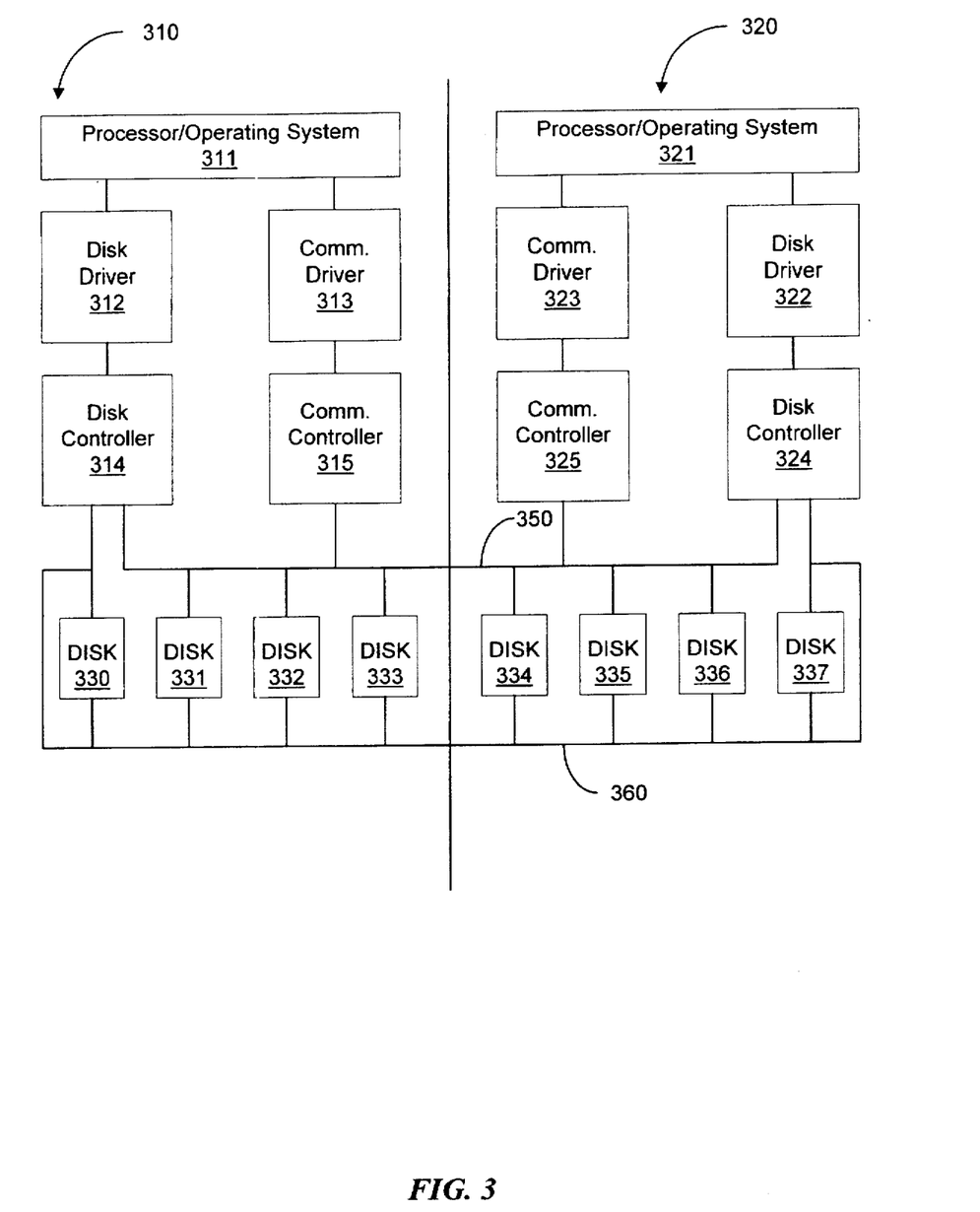
FIG. 3 illustrates a block diagram of a first embodiment of the network server computer system of the present invention employing a shared secondary storage unit and a second, redundant communications channel.

Turning now to FIG. 3, illustrated is a block diagram of a first embodiment of the network server computer system of the present invention employing a shared secondary storage unit and a second, redundant communications channel.

The present invention takes advantage of new technology and standards in the field of serial data communication, such as P1394, Fibre Channel Arbitrated Loop and SSA. Such standards allow for multiple communications protocols and 10 megabytes per second ("MBps") or greater transmission rates, thereby yielding a high speed communications channel. The communications channel should have a data rate of at least 10 megabytes per second, although such rate is not necessary for operation of the present invention. The present invention can even employ a parallel small computer systems interface ("SCSI") bus. Preferably, the data rate should be at least 40 megabytes per second. This higher data rate affords a sufficient bandwidth for communication of data between the first and second server computers 310, 320 to allow one computer to mirror the other or to allow the two to act in concert as a cluster. This high rate further allows for sufficient dataflow between the first and second computers and the secondary storage unit.

In the first embodiment illustrated in FIG. 3, the present invention contemplates a first server computer 310 comprising a first processor adapted to execute a first operating system. The first processor/operating system are referenced jointly as 311. The first operating system controls the first server computer 310 and determines, in conjunction with a corresponding second operating system executing in a second server computer 320, whether the first and second server computers 310, 320 cooperate in a mirror or cluster configuration.

Likewise, the second server computer 320 comprises a second processor adapted to execute a second operating system The second processor/operating system are referenced jointly as 321.

The first and second processor/operating systems 311, 321 communicate data to one another via a first high speed communications channel 350 via first and second communications drivers 313, 323 and first and second communications controllers 315, 325. In this manner, the first server computer 310 is able to transmit data to, or receive data from, the second server computer 320 to allow the first and second server computers 310, 320 to act in concert.

The present invention integrates the separate secondary storage units or disks of the prior art into a single secondary storage subsystem. The first processor/operating system 311 is adapted to communicate data with one or more secondary storage units via a first disk (or secondary storage) driver 312 that is typically implemented as a series of software instructions. The first disk driver 312 controls a first disk (or secondary storage) controller 314 (typically implemented in hardware) that, in turn, controls one or more logical or physical secondary storage units (or disks) 330, 331, 332, 333, 334, 335, 336, 337 via the first channel 350. In this manner, the first processor/operating system 311 is able to store data to, and retrieve data from, the disks 330, 331, 332, 333, 334, 335, 336, 337. The second processor/operating system 321 is also adapted to communicate data with one or more secondary storage units via a second disk (or secondary storage) driver 322. The second disk driver 322 controls a second disk (or secondary storage) controller 324 that, in turn, controls the disks 330, 331, 332, 333, 334, 335, 336, 337. Thus, subject to access granted by the first and second disk controllers 314, 324, both the first and second server computers have access to the disks 330, 331, 332, 333, 334, 335, 336, 337.

Because the first channel 350 provides a large bandwidth for data communications and is adapted to support multiple communications protocols, the first channel 350 can handle both communications dataflow and secondary storage IO dataflow. Thus, the architecture depicted in FIG. 3 allows the first channel 350 to perform a dual purpose. First, the first channel 350 functions to allow data to flow between the communications controllers 315, 325, thereby enabling the first and second server computers 310, 320 to mirror one another or to cooperate to form a cluster server. Second, the first channel 350 serves as a pathway for secondary storage I/O dataflow, thereby enabling the first and second server computers 310, 320 to share secondary storage resources.

In the first embodiment illustrated in FIG. 3, the server computer system further comprises a second communications channel 360 coupling the first and second disk controllers 314, 324. This second channel 360 provides a redundant pathway for secondary storage I/O dataflow between the first and second server computers 310, 320, thereby increasing the overall reliability and fault tolerance of the server computer system. Because there are two communications channels 350, 360 coupling the first and second disk controllers 314, 324, each of the disks 330, 331, 332, 333, 334, 335, 336, 337 are illustrated as being dual-ported, the first channel 350 coupling a first port on the disks 330, 331, 332, 333, 334, 335, 336, 337 to the first and second disk controllers 314, 324 and the second channel 360 coupling a second port on the disks 330, 331, 332, 333, 334, 335, 336, 337 to the first and second disk controllers 314, 324 to provide redundancy and to increase the rate of dataflow between the first and second server 310, 320 computers and the disks 330, 331, 332, 333, 334, 335, 336, 337.

Figure 4:
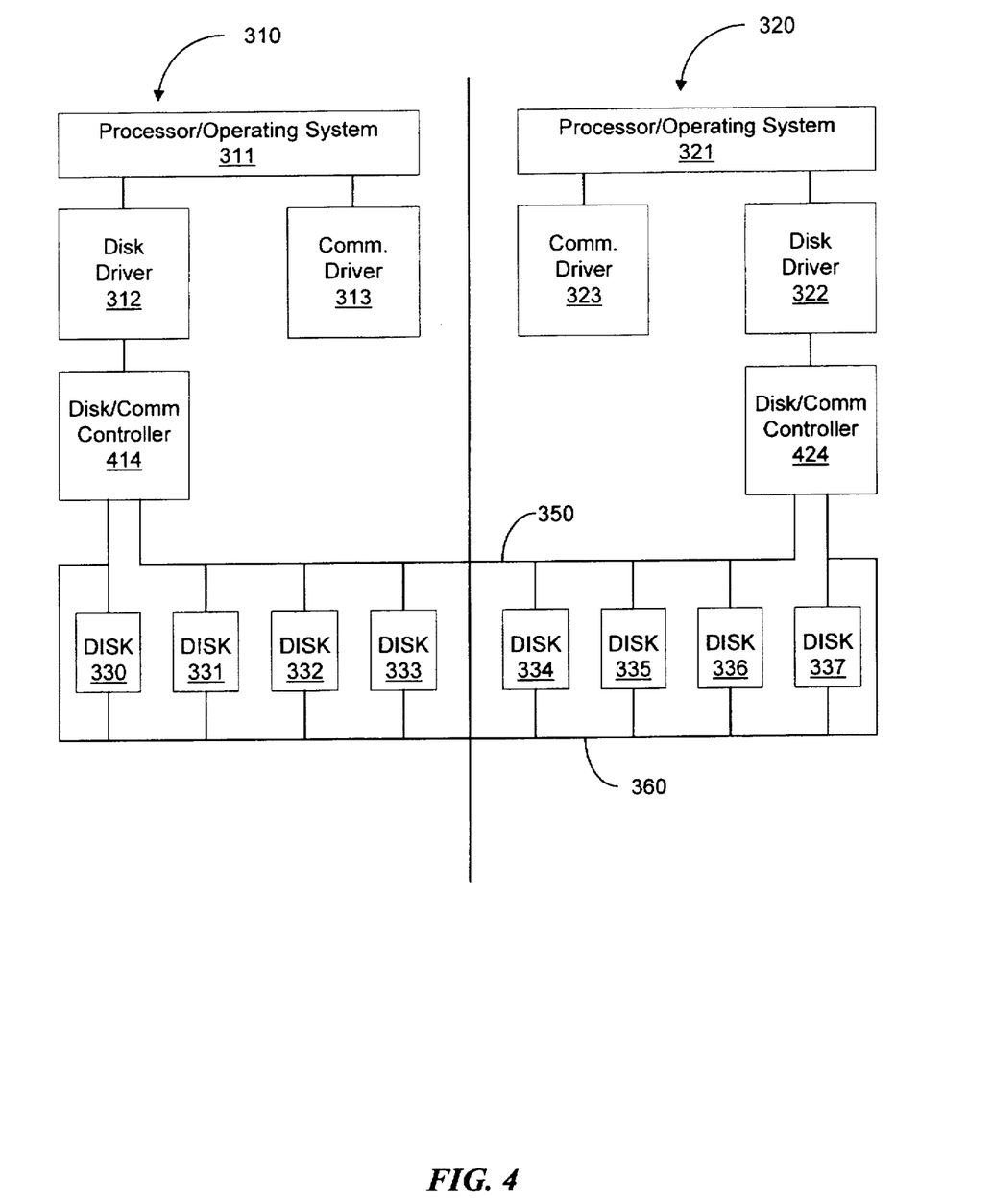
FIG. 4 illustrates a block diagram of a second embodiment of the network server computer system of the present invention employing an integrated secondary storage/communications controller.

Turning now to FIG. 4, illustrated is a block diagram of a second embodiment of the network server computer system of the present invention employing an integrated secondary storage/communications controller.

Current peripheral connect interface ("PCI") specifications (PCI bus specification 2.0) allow multifunction controllers. Such controllers feature a shared memory region and allow needlessly redundant hardware found in separate, single function controllers to be eliminated. The present invention is adapted to function with such integrated, multifunction controllers in a preferred embodiment.

More specifically, FIG. 4 shows an architecture of the present invention wherein the separate first disk and communications controllers 314, 315 are replaced by a single, integrated first disk/communications controller 414. Likewise, the separate second disk and communications controllers 324, 325 are replaced by a single, integrated second disk/communications controller 424. Aside from the advantage afforded by integrating the hardware into single, dual-function controllers 414, 424, the architecture illustrated in FIG. 4 allows the communication of data between the first and second server computers 310, 320 to take place along the second communications channel 360, thereby providing redundancy and increasing the overall reliability and fault tolerance of the server computer system without significantly increasing the cost of the server computer system. Thus, if the first channel 350 fails, the second channel 360 is available to handle both communications and secondary storage I/O dataflow.

Figure 5:
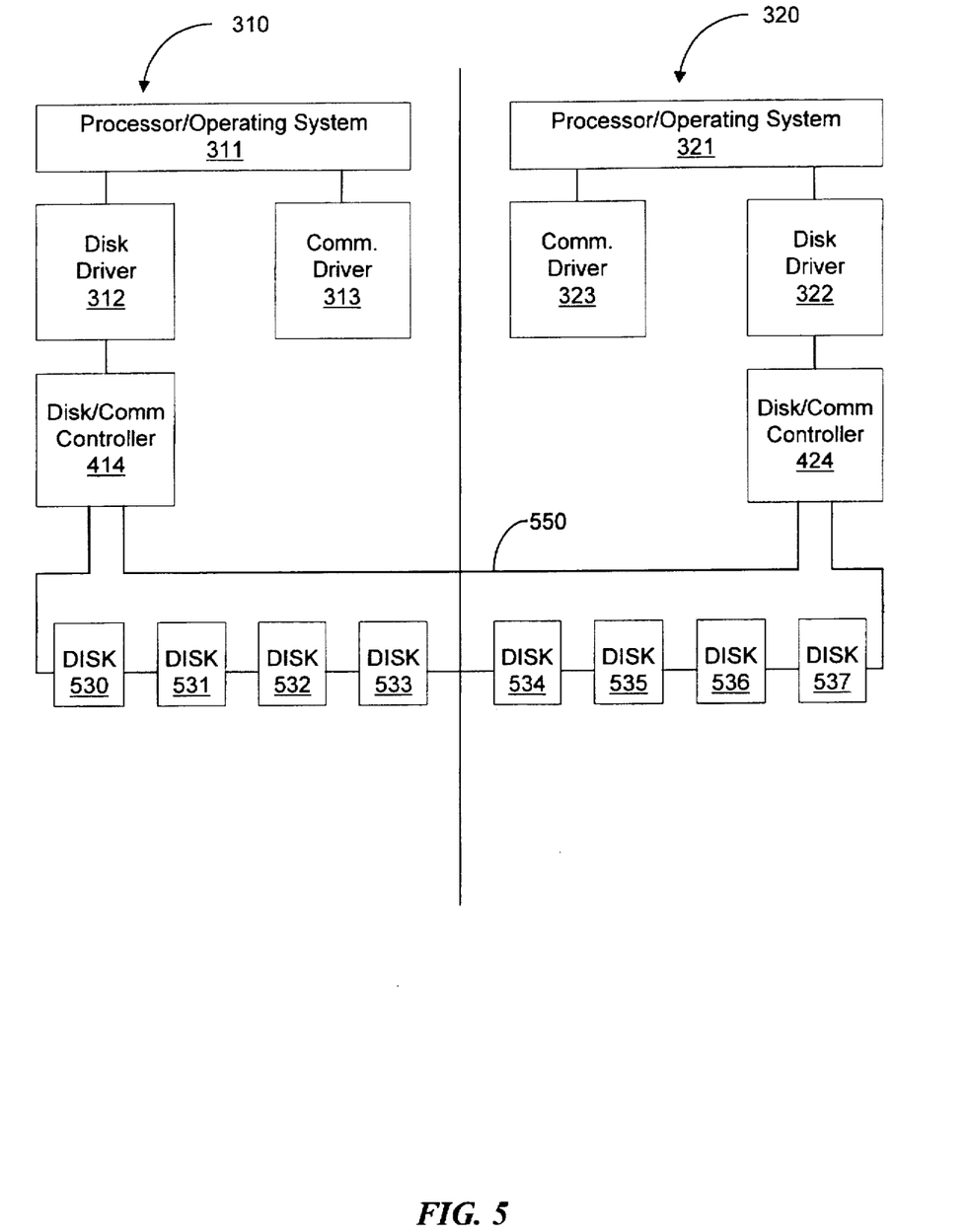
FIG. 5 illustrates a block diagram of a second embodiment of the network server computer system of the present invention employing a loop channel as a communications channel.

Turning now to FIG. 5, illustrated is a block diagram of a second embodiment of the network server computer system of the present invention employing a loop channel as a communications channel. As previously mentioned, in one embodiment of the present invention, the first channel 350 is a loop channel passing through the each disk 330, 331, 332, 333, 334, 335, 336, 337. Some high speed communications channel architectures, such as Fibre Channel, are preferably configured as loops. Other architectures, such as SSA, are designed specifically to be used as loops.

In FIG. 5, a single loop channel 550 couples the first and second integrated disk/communications controllers 414, 424. A plurality of disks 530, 531, 532, 533, 534, 535, 536, 537 are adapted to operate in a loop channel environment and are thus interspersed into the loop channel 550.

From the above description, it is apparent that the present invention provides a server computer system and a method of operation thereof. The server computer system comprises: (1) a first computer having a first processor coupled to a first secondary storage controller and a first communications controller, (2) a second computer having a second processor coupled to a second secondary storage controller and a second communications controller, a communications channel coupling the first and second secondary storage controllers and the first and second communications controllers and providing a channel for communication of data between the first and second processors to thereby allow an operation of the second computer to mirror an operation of the first computer and (3) a secondary storage unit coupled to the communications channel and accessible by a selected one of the first and second processors, the communications channel further providing a channel for communication of data between the first and second computers and the secondary storage unit, the secondary storage unit thereby being available to the second computer upon occurrence of a failure in the first computer. It should be understood by one skilled in the art that the first and second storage controllers may be configured to treat the disk drives coupled to the first processor and second processor as a single unit of disk drives, or as at least two identical disk drives, as required.

Although the present invention and its advantages have been described in detail, those skilled in the art should understand that they can make various changes, substitutions and alterations herein without departing from the spirit and scope of the invention in its broadest form.

What is claimed is:

1. A server computer system comprising:

a first computer having a first processor executing a first operating system, said first processor being coupled to a first secondary storage controller and a first communications controller;

a second computer having a second processor executing a second operating system, said second processor being coupled to a second secondary storage controller and a second communications controller;

a communications channel coupling said first and second secondary storage controllers and said first and second communications controllers and providing a channel for communication of data between said first and second processors to thereby allow an operation of said second computer to mirror an operation of said first computer; and a single common fault tolerant secondary storage redundant array of disks (RAID) subsystem coupled to said communications channel and accessible by said first and second processors, said communications channel further providing a channel for communication of data between said first and second computers and said secondary storage RAID subsystem, said secondary storage RAID subsystem thereby being available to said second computer upon occurrence of a failure in said first computer.

2. The system as recited in claim 1 wherein said first secondary storage controller and said first communications controller are embodied as a single, integrated controller.

3. The system as recited in claim 1 further comprising a second communications channel coupling said first and second secondary storage controllers.

4. The system as recited in claim 1 further comprising a second communications channel coupled to said first and second secondary storage controllers and said first and second communications controllers to thereby provide a redundant channel for communication of data therebetween.

5. The system as recited in claim 1 wherein said secondary storage RAID subsystem is dual-ported, said system further comprising a second communications channel coupling a second port on said secondary storage RAID subsystem to said first and second secondary storage controllers.

6. The system as recited in claim 1 wherein the secondary storage RAID subsystem includes a plurality of secondary storage units coupled to said communications channel.

7. The system as recited in claim 1 wherein said communications channel is a loop channel passing through said secondary storage RAID subsystem.

8. A method of operating a server computer system, comprising the steps of:

coupling a first computer having a first processor executing a first operating system to a first secondary storage controller and a first communications controller;

coupling a second computer having a second processor executing a second operating system to a second secondary storage controller and a second communications controller;

communicating data via a communications channel coupling said first and second secondary storage controllers and said first and second communications controllers, said communications channel providing a channel for communication of data between said first and second processors to thereby allow an operation of said second computer to mirror an operation of said first computer; and accessing a single common fault tolerant secondary storage redundant array of disks (RAID) subsystem coupled to said communications channel with said first and second processors, said communications channel further providing a channel for communication of data between said first and second computers and said secondary storage RAID subsystem, said secondary storage RAID subsystem thereby being available to said second computer upon occurrence of a failure in said first computer.

9. The method as recited in claim 8 wherein said step of coupling said first computer to a first secondary storage controller and a first communications controller comprises the step of coupling said first computer to a single, integrated first secondary storage and communications controller.

10. The method as recited in claim 8 further comprising the step of coupling a second serial communications channel to said first and second secondary storage controllers.

11. The method as recited in claim 8 further comprising the step of coupling a second communications channel to said first and second secondary storage controllers and said first and second communications controllers to thereby provide a redundant channel for communication of data therebetween.

12. The method as recited in claim 8 wherein said secondary storage RAID subsystem includes a secondary storage unit; and said step of accessing comprises the step of accessing a dual-ported secondary storage unit and said method further comprises the step of coupling a second communications channel to a second port on said secondary storage unit and to said first and second secondary storage controllers.

13. The method as recited in claim 8 wherein said secondary storage RAID subsystem includes a plurality of secondary storage units; and said step of accessing comprises the step of accessing the plurality of secondary storage units coupled to said communications channel.

14. The method as recited in claim 8 further comprising the step of controlling said first and second secondary storage controllers with said first and second processors via first and second secondary storage driver routines executed in said first and second processors, respectively.

15. The method as recited in claim 8 further comprising the step of controlling said first and second secondary storage controllers with said first and second processors via first and second secondary storage driver routines and first and second communications driver routines executed in said first and second processors, respectively.

16. The method as recited in claim 8 further comprising the step of controlling said first and second secondary storage controllers with first and second operating systems executing in said first and second processors, respectively.

17. The method as recited in claim 8 wherein said step of communicating data comprises the step of communicating data via a communications channel that is a loop channel passing through said secondary storage subsystem.

18. A server computer system, comprising:
a first computer having a first processor executing a first operating system, said first processor being coupled to a first secondary storage controller and a first communications controller;
a second computer having a second processor executing a second operating system, said second processor being coupled to a second secondary storage controller and a second communications controller;
a first communications channel coupling said first and second secondary storage controllers and said first and second communications controllers and providing a channel for communication of data between said first and second processors to thereby allow an operation of said second computer to mirror an operation of said first computer;
a second communications channel coupling said first and second secondary storage controllers; and
a single common fault tolerant secondary storage redundant array of disks (RAID) subsystem, the RAID subsystem including a plurality of secondary storage units coupled to said first and second communications channels and accessible by said first and second processors, first and second communications channels providing redundant channels for communication of data between said first and second computers and said plurality of secondary storage units, said plurality of secondary storage units thereby being available to said second computer upon occurrence of a failure in said first computer.

19. The system as recited in claim 18 wherein said first secondary storage controller and said first communications controller are embodied as a single, integrated controller.

20. The system as recited in claim 18 wherein said plurality of secondary storage units are dual-ported, a first port of each said secondary storage unit being coupled to said first communications channel, a second port on each said secondary storage unit being coupled to said second communications channel.

21. The system as recited in claim 18 wherein said first communications channel is a portion of a loop channel passing through each said secondary storage unit.

22. The system as recited in claim 18 wherein said first and second communications channels have a data rate of at least 10 megabytes per second.

23. A method of operating a server computer system, comprising the steps of:
coupling a first computer having a first processor executing a first operating system to a first secondary storage controller and a first communications controller;
coupling a second computer having a second processor executing a second operating system to a second secondary storage controller and a second communications controller;
communicating data via a first communications channel coupling said first and second secondary storage controllers and said first and second communications controllers, said first communications channel providing a channel for communication of data between said first and second processors to thereby allow an operation of said second computer to mirror an operation of said first computer;
communicating data via a second communications channel coupling said first and second secondary storage controllers; and
accessing selectable ones of a plurality of secondary storage units within a single common fault tolerant redundant array of disks (RAID) storage subsystem coupled to said first and second communications channels and accessible by said first and second processors, said first and second communications channels providing redundant channels for communication of data between said first and second computers and said plurality of secondary storage units, said plurality of secondary storage units thereby being available to said second computer upon occurrence of a failure in said first computer.

24. The method as recited in claim 23 wherein said step of coupling said first computer to a first secondary storage controller and a first communications controller comprises the step of coupling said first computer to a single, integrated first secondary storage and communications controller.

25. The method as recited in claim 23 wherein said step of accessing selectable ones of a plurality of secondary storage units comprises the step of accessing selectable ones of a plurality of dual-ported secondary storage units, a first port of said secondary storage unit coupled to said first communications channel, a second port on said secondary storage unit coupled to said second communications channel.

26. The method as recited in claim 23 wherein said step of communicating data via said first communications channel comprises the step of communicating data via a first communications channel that is a portion of a loop channel passing through said secondary storage unit.

27. The method as recited in claim 23 wherein said step of communicating data via said first and second communications channels comprises the steps of communicating data via said first and second communications channels having a data rate of at least 10 megabytes per second.

28. The method as recited in claim 23 further comprising the step of allowing said first and second computers to function as a cluster with operating systems executing in said first and second processors.

29. A server computer system comprising:
- a first computer having a first processor executing a first operating system, the first processor being coupled to a first integrated controller;
- a second computer having a second processor executing a second operating system, the second processor being coupled to a second integrated controller;
- a communications channel coupling said first and second integrated controllers and providing a channel for communication of data between the first and second processors to thereby selectively allow the first and second computers to mirror their operation and to operate as a cluster; and
- a single common, fault tolerant secondary storage redundant array of disks (RAID) subsystem coupled to the communications channel and accessible by the first and second processors, the communications channel further providing a channel for communication of data between the first and second computers and the secondary storage RAID subsystem.

30. The server computer system of claim 29 wherein the communications channel is a serial communications channel.

31. The server computer system of claim 30 wherein the serial communications channel supports a serial communications standard selected from P1394, Fibre Channel, and SSA.

32. The server computer system of claim 30 wherein the serial communications channel has a data transmission rate of at least 10 megabytes per second.

33. The server computer system of claim 29 further comprising a second communications channel coupling the first and second integrated controllers to thereby provide a second channel for communication of data between the first and second processors.

34. The server computer system of claim 33 wherein secondary storage RAID subsystem is coupled to the second communications channel.

* * * * *